(12) United States Patent
Harada

(10) Patent No.: US 11,090,810 B2
(45) Date of Patent: Aug. 17, 2021

(54) ROBOT SYSTEM

(71) Applicant: Seiko Epson Corporation, Tokyo (JP)

(72) Inventor: Tomoki Harada, Azumino (JP)

(73) Assignee: Seiko Epson Corporation (JP)

( * ) Notice: Subject to any disclaimer, the term of this patent is extended or adjusted under 35 U.S.C. 154(b) by 353 days.

(21) Appl. No.: 16/155,994

(22) Filed: Oct. 10, 2018

(65) Prior Publication Data

US 2019/0105781 A1 Apr. 11, 2019

(30) Foreign Application Priority Data

Oct. 11, 2017 (JP) .............................. JP2017-197296

(51) Int. Cl.
*B25J 9/16* (2006.01)

(52) U.S. Cl.
CPC ........... *B25J 9/1692* (2013.01); *B25J 9/1697* (2013.01); *G05B 2219/39057* (2013.01)

(58) Field of Classification Search
CPC ...... B25J 9/1692; B25J 9/1697; B25J 19/021; B25J 19/023; G05B 2219/39057; G06T 7/80
See application file for complete search history.

(56) References Cited

U.S. PATENT DOCUMENTS

| | | | |
|---|---|---|---|
| 9,193,073 B1 | 11/2015 | Huang et al. | |
| 2002/0034327 A1 | 3/2002 | Watanabe et al. | |
| 2011/0026833 A1* | 2/2011 | Sugino | G06K 9/00664 382/201 |

(Continued)

FOREIGN PATENT DOCUMENTS

| | | |
|---|---|---|
| EP | 2993002 A1 | 3/2016 |
| JP | 2002-090113 A | 3/2002 |

(Continued)

OTHER PUBLICATIONS

E. Di Stefano et al., "A Multi-Camera Framework for Visual Servoing of a Collaborative Robot in Industrial Environments", 22nd IEEE International Conference on Emerging Technologies and Factory Automation, Sep. 12, 2017 (8 pages).

(Continued)

*Primary Examiner* — Khoi H Tran
*Assistant Examiner* — Nhi Q Bui
(74) *Attorney, Agent, or Firm* — Harness, Dickey & Pierce, P.L.C.

(57) ABSTRACT

A robot system includes a robot including a robot arm and a first camera, a second camera installed separately from the robot, and a control device which controls the robot and the second camera. The first camera has already been calibrated in advance, and a first calibration data which is the calibration data between the coordinate system of the robot and the coordinate system of the first camera is known. The control device (i) images a calibration pattern with the first camera to acquire a first pattern image and images a calibration pattern with the second camera to acquire a second pattern image, and (ii) executes calibration process for obtaining a second calibration data which is the calibration data between the coordinate system of the robot and the coordinate system of the second camera using the first pattern image, the second pattern image, and the first calibration data.

6 Claims, 12 Drawing Sheets

(56) References Cited

U.S. PATENT DOCUMENTS

| | | | | |
|---|---|---|---|---|
| 2015/0127153 A1* | 5/2015 | Yamaguchi | ............ | B25J 9/1692 |
| | | | | 700/254 |
| 2015/0306767 A1* | 10/2015 | Saito | ........................ | B25J 9/162 |
| | | | | 700/255 |
| 2016/0059419 A1* | 3/2016 | Suzuki | ................... | B25J 9/1697 |
| | | | | 700/114 |
| 2016/0288327 A1* | 10/2016 | Motoyoshi | ........... | G05B 19/231 |
| 2018/0194007 A1* | 7/2018 | Namiki | ................... | B25J 19/04 |

FOREIGN PATENT DOCUMENTS

| | | |
|---|---|---|
| JP | 2011-033497 A | 2/2011 |
| JP | 2011-133313 A | 7/2011 |
| JP | 2016-052695 A | 4/2016 |

OTHER PUBLICATIONS

Extended European Search Report for Patent Application No. EP 8199584.6 dated Apr. 11, 2019 (10 pages).

* cited by examiner

FIG. 1
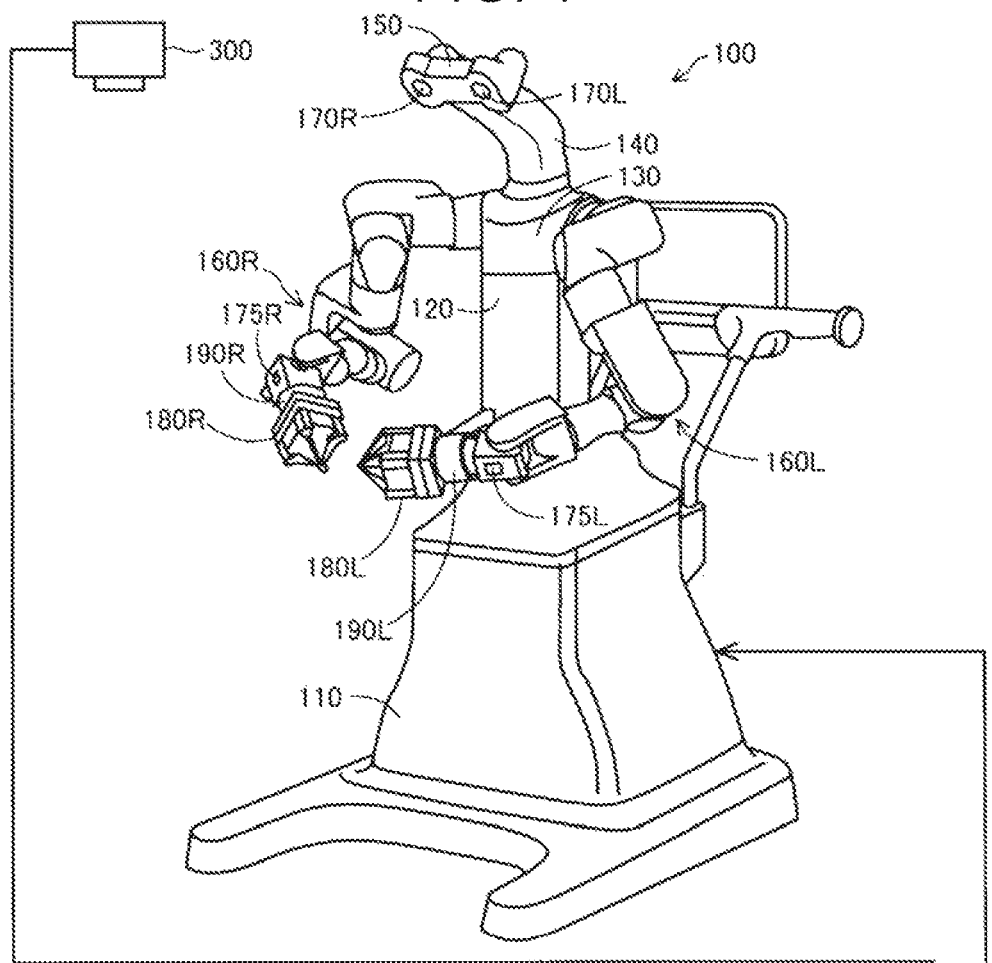
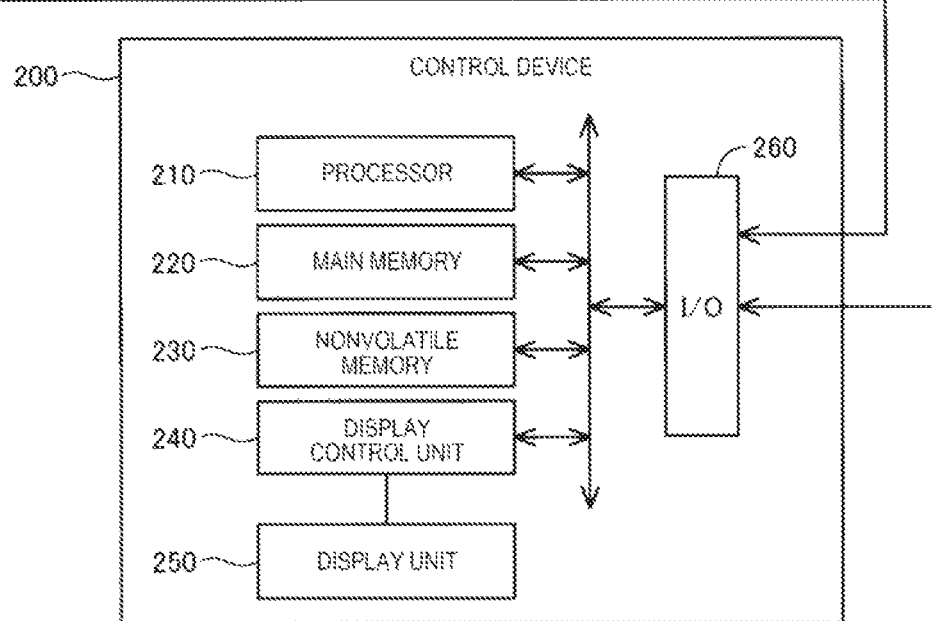

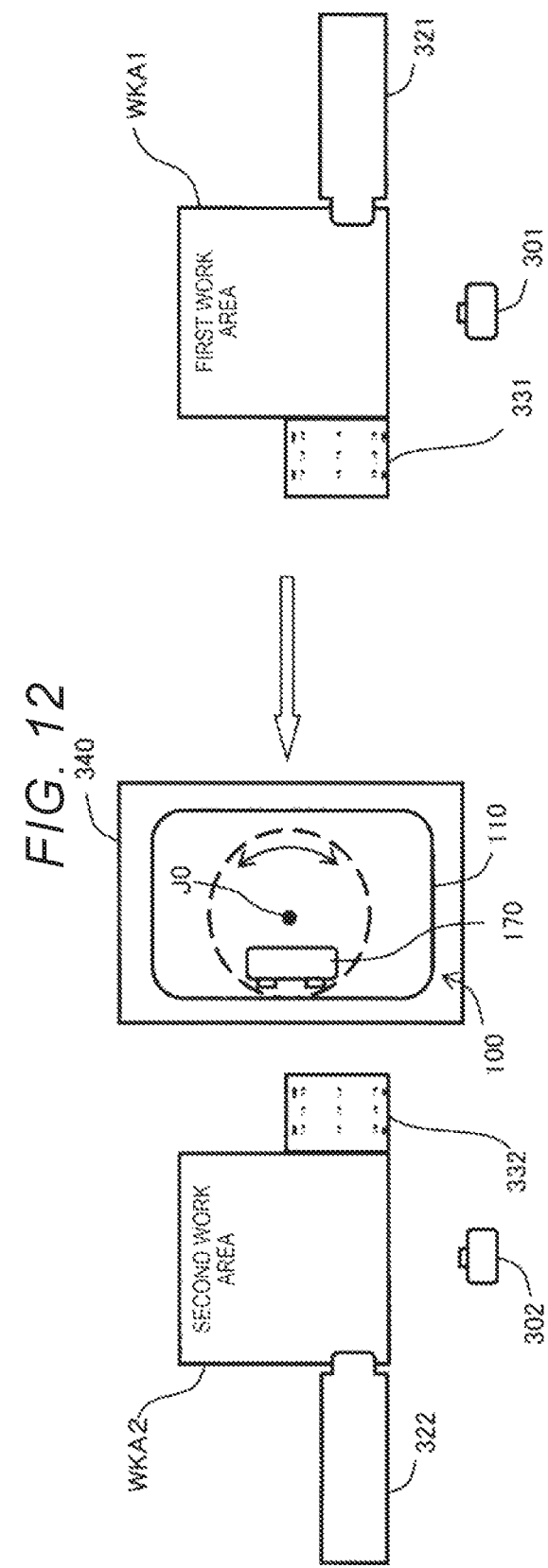

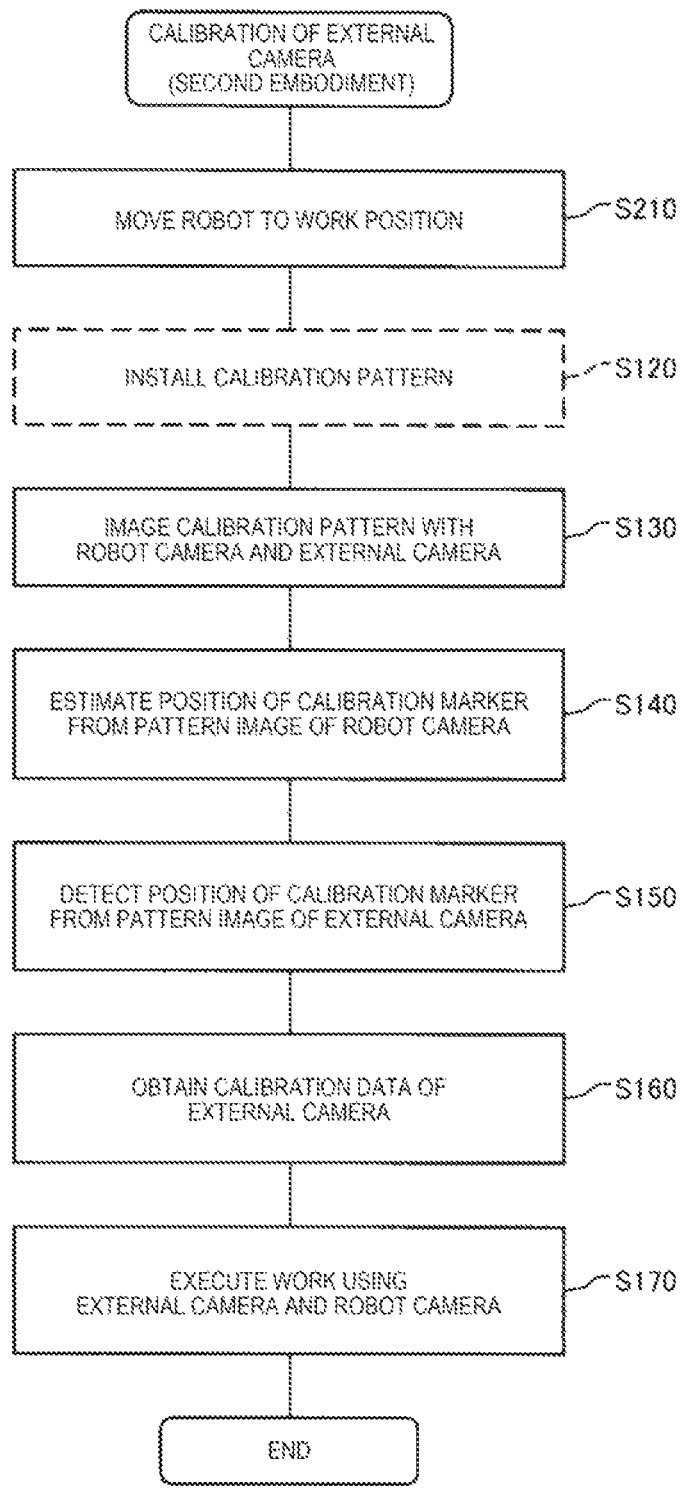

ROBOT SYSTEM

BACKGROUND

1. Technical Field

The present invention relates to calibration of a camera of a robot system.

2. Related Art

In order to cause a robot to perform advanced process, there is a case where a camera is installed in a robot to give a function of the eye. As a method for installing the camera, there are a method of installing the camera independently of a robot arm and a method of installing the camera (referred to as "hand-end camera") on the robot arm.

JP-A-2016-52695 discloses a robot system using a hand-end camera and an external camera installed outside the robot. In this related art, in order to calibrate the external camera, a robot arm is moved to a plurality of positions and orientations for calibration, calibration marks are imaged by both the hand-end camera and the external camera in each position and orientation, and the calibration of the external camera is executed using the imaging result.

However, in the technique described in JP-A-2016-52695, there is a problem that it is indispensable to provide the hand-end camera at the tip end of the robot arm and it cannot be applied in a case where the robot camera is installed at a place other than the tip end of the robot arm. Also, there is a problem that since it is necessary to set the hand-end camera to a plurality of position and orientations in order to calibrate the external camera, the operation of the robot arm is indispensable and as a result, it takes a considerable time for the calibration. There is a demand for a technique that can easily calibrate the external camera by a method different from that of JP-A-2016-52695.

SUMMARY

An advantage of some aspects of the invention is to solve at least a part of the problems described above, and the invention can be implemented as the following aspects.

(1) According to a first aspect of the invention, a robot system that includes a robot including a robot arm and a first camera, a second camera installed separately from the robot, and a control device which controls the robot and the second camera is provided. The control device includes a processor. The second camera is installed so as to be able to image a calibration position that is outside a field of view of the first camera in a state in which a work area in which work using the robot arm is performed is imaged by the first camera. The processor (a) drives a joint of the robot so as to image the calibration position by the first camera before the work is executed in the work area, (b) images a calibration pattern installed at the calibration position by the first camera to acquire a first pattern image and images the calibration pattern installed at the calibration position by the second camera to acquire a second pattern image, (c) executes calibration process for obtaining second calibration data which is calibration data of the second camera using the first pattern image, the second pattern image, and first calibration data which is known calibration data for the first camera, and (d) executes work in the work area while imaging the work area with the first camera after execution of the calibration process and executes an operation using the robot arm in the field of view of the second camera while performing imaging by the second camera in the field of view of the second camera.

According to this robot system, calibration of the second camera may be easily performed by imaging the calibration pattern by both the first camera and the second camera at a position outside the work area before work in the work area is started. In addition, when performing the work while imaging the work area with the first camera after calibration process of the second camera, in a case where the robot performs an operation different from the work in the work area while performing imaging using the second camera in the field of view of the second camera, it is possible to accurately image the operation of the robot using the calibrated second camera.

(2) In the robot system according to the aspect of the invention, the joint of the robot may be a torsion joint that pivots the first camera with respect to abase of the robot. According to this robot system, it is possible to switch between a state in which work in the work area is imaged by the first camera and a state in which the calibration pattern is imaged by the first camera for calibration of the second camera, only by the operation of the torsion joint. Accordingly, calibration of the second camera may be easily performed before work in the work area is started.

(3) In the robot system according to the aspect of the invention, the field of view of the second camera may include a component supply area for supplying a component used for work in the work area and an operation using the robot arm in the field of view of the second camera may be an operation of picking up the component with the robot arm.

According to this robot system, in a case where a component is supplied at a position different from the work area, there is no need to image the component with the first camera and it is possible to pick up the component with the robot arm while imaging the component with the second camera.

(4) According to a second aspect of the invention, a robot system that includes a robot including a robot arm and a first camera, a second camera installed separately from the robot, and a control device which controls the robot and the second camera is provided. The robot is configured to move between a plurality of work areas and to perform work using the robot arm in each work area. The second camera includes a plurality of second cameras installed to image the plurality of work areas. Every time the robot moves and reaches one work area of the plurality of work areas, the control device (a) images a calibration pattern installed in the work area with the first camera to acquire a first pattern image and images a calibration pattern installed in the work area with the second camera to acquire a second pattern image, (b) executes calibration process for obtaining second calibration data which is calibration data of the second camera using the first pattern image, the second pattern image, and first calibration data which is known calibration data for the first camera, and (c) executes work in the work area while imaging the work area with the first camera and the second camera after execution of the calibration process.

According to this robot system, calibration of the second camera may be easily executed by imaging the calibration pattern by both the first camera and the second camera before the work in each work area of the plurality of work areas is started. Since the work area of the second camera may be imaged using both the first camera and the second camera after calibration process of the second camera, it is possible to accurately image the work in the work area.

(5) In the robot system according to the aspect of the invention, the robot may be configured to move to positions other than the plurality of work areas.

According to this robot system, even in a case where a robot having a high degree of freedom of movement is used, calibration of the second camera may be easily executed.

(6) In the robot system according to the aspect of the invention, the first camera may be a 3D camera and the second camera may be a 2D camera.

According to this robot system, since the first camera is a 3D camera such as a stereo camera, even in a case where the second camera is a 2D camera, calibration of the second camera may be accurately performed.

(7) In the robot system according to the aspect of the invention, the first camera may be installed on a part of the robot rather than the robot arm.

According to this robot system, it is possible to easily perform calibration of the second camera by using the first camera installed on a part which is not a robot arm such as a base or a casing of the robot.

(8) In the robot system according to the aspect of the invention, the first camera may be installed on the robot arm.

According to this robot system, it is possible to easily perform calibration of the second camera by using the first camera installed on the robot arm.

(9) In the robot system according to the aspect of the invention, the control device may install the calibration pattern at a position where the calibration pattern may be imaged with the first camera and the second camera using the robot arm before the calibration pattern is imaged.

According to this robot system, since the calibration pattern is installed by using the robot arm, it is possible to install the calibration pattern only when necessary for calibration.

(11) According to a third aspect of the invention, a robot system that includes a robot including a robot arm and a first camera, a second camera installed separately from the robot, and a control device which controls the robot and the second camera is provided. The control device includes a processor. The robot is configured to move between a plurality of work areas and to perform work using the robot arm in each work area. The second camera includes a plurality of second cameras installed to image the plurality of work areas. Every time the robot moves and reaches one work area of the plurality of work areas, the processor (a) images a calibration pattern installed in the work area with the first camera to acquire a first pattern image and images a calibration pattern installed in the work area with the second camera to acquire a second pattern image, (b) executes calibration process for obtaining second calibration data which is calibration data of the second camera using the first pattern image, the second pattern image, and first calibration data which is known calibration data for the first camera, and (c) executes work in the work area while imaging the work area with the first camera and the second camera after execution of the calibration process.

According to this robot system, calibration of the second camera may be easily executed by imaging the calibration pattern by both the first camera and the second camera before the work in each work area of the plurality of work areas is started. Since the work area of the second camera may be imaged using both the first camera and the second camera after calibration process of the second camera, it is possible to accurately image the work in the work area.

According to still another aspect of the invention, a robot system that includes a robot including a robot arm and a first camera, a second camera installed separately from the robot, and a control device which controls the robot and the second camera is provided. The first camera has already been calibrated in advance, and first calibration data which is calibration data of the first camera is known. The control device (i) images a calibration pattern with the first camera to acquire a first pattern image and images a calibration pattern with the second camera to acquire a second pattern image, and (ii) executes calibration process for obtaining second calibration data which is calibration data of the second camera using the first pattern image, the second pattern image, and first calibration data which is known calibration data for the first camera. The calibration pattern preferably includes a plurality of calibration markers. The first camera of the robot may be provided on a part which is not a robot arm, for example, on the head portion of the robot.

According to this robot system, calibration of the second camera may be easily performed by imaging the calibration pattern with both the second camera and the first camera which is calibrated in advance.

The invention may be realized in various forms other than those described above. For example, the invention may be realized in the form of a control device of a robot system, a computer program for realizing the function of the control device, a non-transitory storage medium in which the computer program is recorded, and the like.

BRIEF DESCRIPTION OF THE DRAWINGS

The invention will be described with reference to the accompanying drawings, wherein like numbers reference like elements.

FIG. 1 is a conceptual diagram of a robot system according to a first embodiment.

FIG. 12 is an explanatory view illustrating a state where calibration of the second camera is performed in a second work area.

FIG. 13 is a flowchart illustrating a procedure of calibration process in the second embodiment.

DESCRIPTION OF EXEMPLARY EMBODIMENTS

First Embodiment

Figure 2:
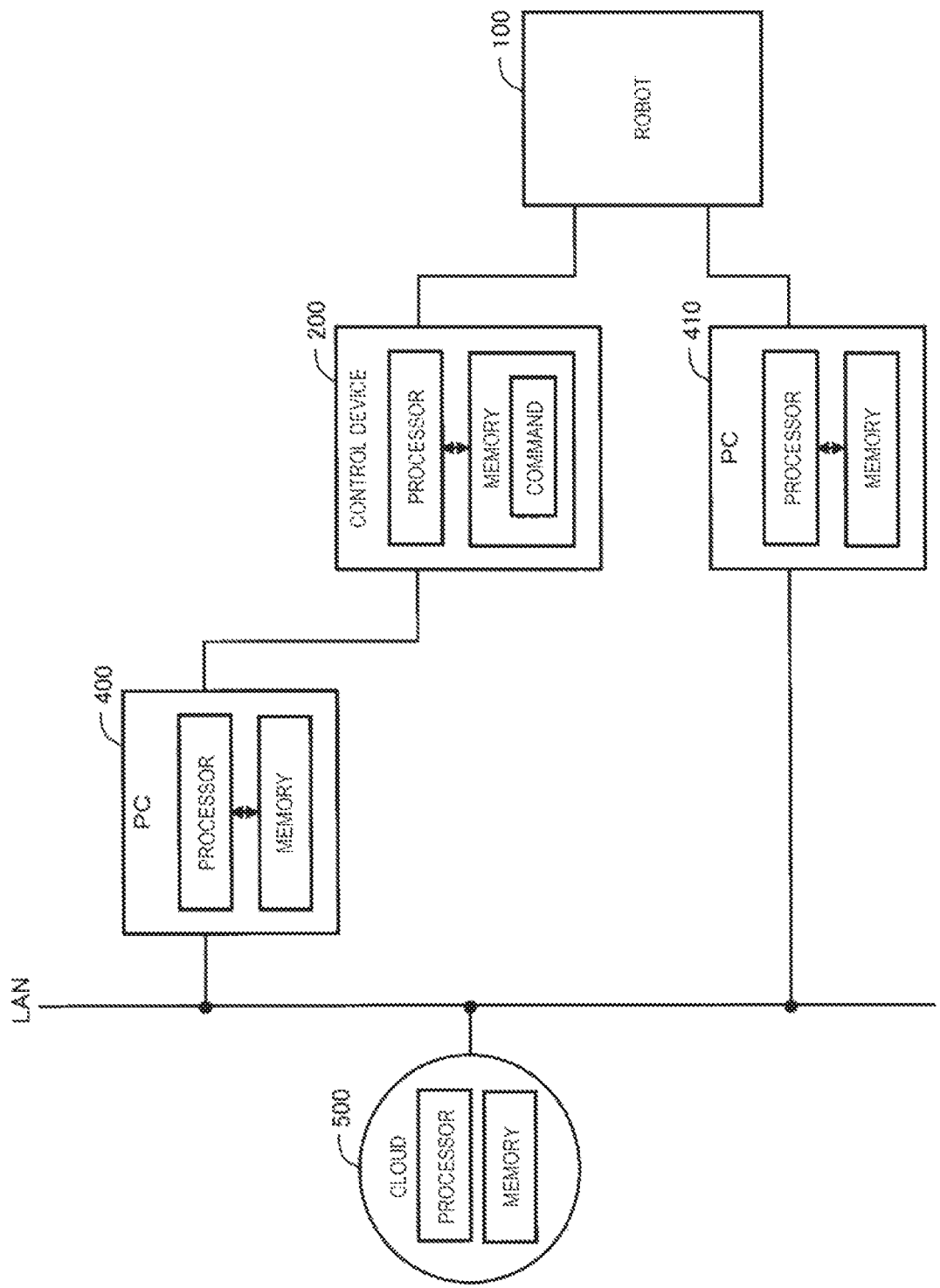
FIG. 2 is a conceptual diagram illustrating an example of a control device having a plurality of processors.

FIG. 1 is a conceptual diagram of a robot system according to a first embodiment. This robot system includes a robot 100, a control device 200, and an external camera 300 installed separately from the robot 100. This robot 100 is an autonomous robot capable of performing work while recognizing a work target with a camera, adding and subtracting force freely, and performing determination autonomously. The robot 100 can operate as a teaching playback robot that executes work in accordance with teaching data created in advance.

The robot 100 includes a base 110, a body portion 120, a shoulder portion 130, a neck portion 140, a head portion 150, and two robot arms 160L and 160R. Hands 180L and 180R are detachably attached to the robot arms 160L and 160R. These hands 180L and 180R are end effectors that hold workpieces and tools. Cameras 170L and 170R are installed on the head portion 150. These cameras 170L and 170R are provided independently of the robot arms 160L and 160R. On the wrist portions of the robot arms 160L and 160R, hand eyes 175L and 175R as hand-end cameras are provided.

Hereinafter, the cameras 170L and 170R provided on the head portion 150 are also referred to as a "robot camera" or "first camera 170". An external camera 300 installed separately from the robot 100 is also referred to as a "second camera". In the first embodiment, the robot camera 170 is configured as a 3D camera (three-dimensional camera) such as a stereo camera, and the external camera 300 is configured as a 2D camera (two-dimensional camera). The external camera 300 may be configured as the 3D camera.

On the wrist portions of the robot arms 160L and 160R, furthermore, force sensors 190L and 190R are provided. The force sensors 190L and 190R are sensors for detecting a reaction force and moment against the force exerted on the workpieces by the hands 180L and 180R. As the force sensors 190L and 190R, for example, a six-axis force sensor capable of simultaneously detecting six components of force components in the translational three axial directions and moment components around three rotation axes can be used. The force sensors 190L and 190R can be omitted.

The letters "L" and "R" attached at the end of the reference numerals of the robot arms 160L and 160R, the robot cameras 170L and 170R, the hand eyes 175L and 175R, the hands 180L and 180R, and the force sensors 190L and 190R respectively mean "left" and "right". In a case where these distinctions are unnecessary, description will be made using a symbol in which the letters "L" and "R" are omitted.

The control device 200 includes a processor 210, a main memory 220, a nonvolatile memory 230, a display control unit 240, a display unit 250, and an I/O interface 260. These units are connected via a bus. The processor 210 is, for example, a microprocessor or processor circuit. The control device 200 is connected to the robot 100 and a second camera 300 via the I/O interface 260. The control device 200 may be accommodated inside the robot 100.

As a configuration of the control device 200, various configurations other than the configuration illustrated in FIG. 1 can be adopted. For example, the processor 210 and the main memory 220 may be deleted from the control device 200 of FIG. 1, and the processor 210 and the main memory 220 may be provided in another device communicably connected to the control device 200. In this case, the entire device including the other device and the control device 200 functions as a control device of the robot 100. In another embodiment, the control device 200 may include two or more processors 210. In still another embodiment, the control device 200 may be realized by a plurality of devices communicably connected to each other. In these various embodiments, the control device 200 is configured as a device or group of devices including one or more processors 210.

FIG. 2 is a conceptual diagram illustrating an example in which a robot control device is configured by a plurality of processors. In this example, in addition to the robot 100 and the control device 200 thereof, personal computers 400 and 410 and a cloud service 500 provided via a network environment such as a LAN are drawn. Each of the personal computers 400 and 410 includes a processor and a memory. In the cloud service 500, a processor and a memory can also be used. It is possible to realize a control device of the robot 100 by using some or all of the plurality of processors.

Figure 3:
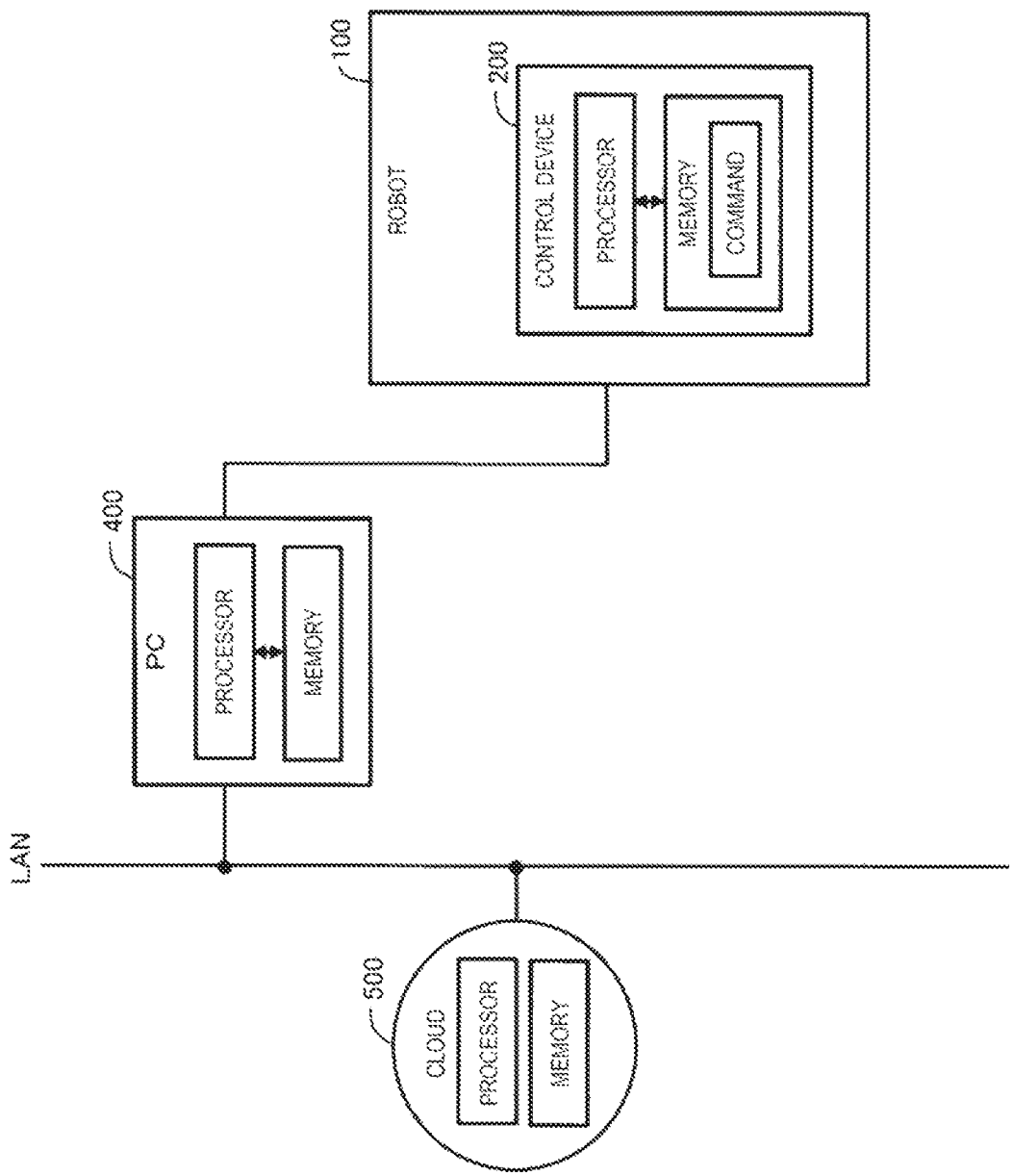
FIG. 3 is a conceptual diagram illustrating another example of the control device having the plurality of processors.

FIG. 3 is a conceptual diagram illustrating another example in which the robot control device is configured by a plurality of processors. This example is different from FIG. 2 in that the control device 200 of the robot 100 is stored in the robot 100. Also, in this example, it is possible to realize the control device of the robot 100 by using some or all of the plurality of processors.

Figure 4:
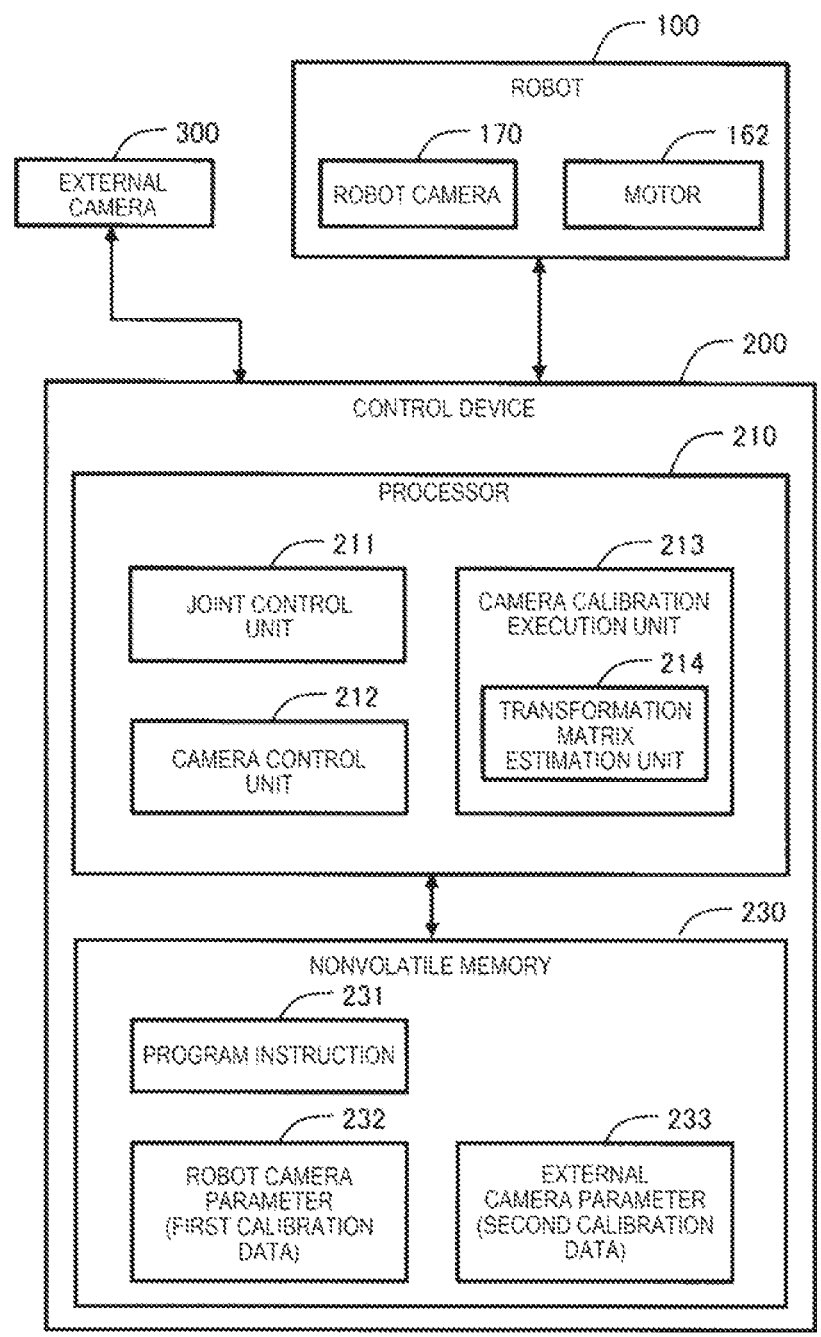
FIG. 4 is a block diagram illustrating functions of a robot and a control device.

FIG. 4 is a block diagram illustrating functions of the robot 100 and the control device 200. The processor 210 of the control device 200 executes various program instructions 231 stored in advance in the nonvolatile memory 230 to thereby realize the functions of a joint control unit 211, a camera control unit 212, and a camera calibration execution unit 213, respectively. The joint control unit 211 drives each joint by controlling a motor 162 provided in each joint in the robot 100. The camera control unit 212 controls the robot camera 170 and the external camera 300, respectively, to execute imaging. A camera calibration execution unit 213 has a function of executing calibration process of the external camera 300 and includes a trans formation matrix estimation unit 214. However, some or all of the functions of these units 211 to 214 may be realized by a hardware circuit. The functions of these units 211 to 214 will be described later.

In the nonvolatile memory 230, in addition to the program instructions 231, robot camera parameters 232 and external camera parameters 233 are stored. The robot camera parameters 232 are calibration data of the robot camera 170 and include various parameters for performing coordinate transformation between a camera coordinate system of the robot camera 170 and a robot coordinate system. The external camera parameters 233 are calibration data of the external camera 300 and include various parameters for performing coordinate transformation between the camera coordinate system of the external camera 300 and the robot coordinate system. The robot camera parameters 232 are known and stored in the nonvolatile memory 230 in advance. The external camera parameters 233 are created by executing calibration process to be described later.

Figure 5:
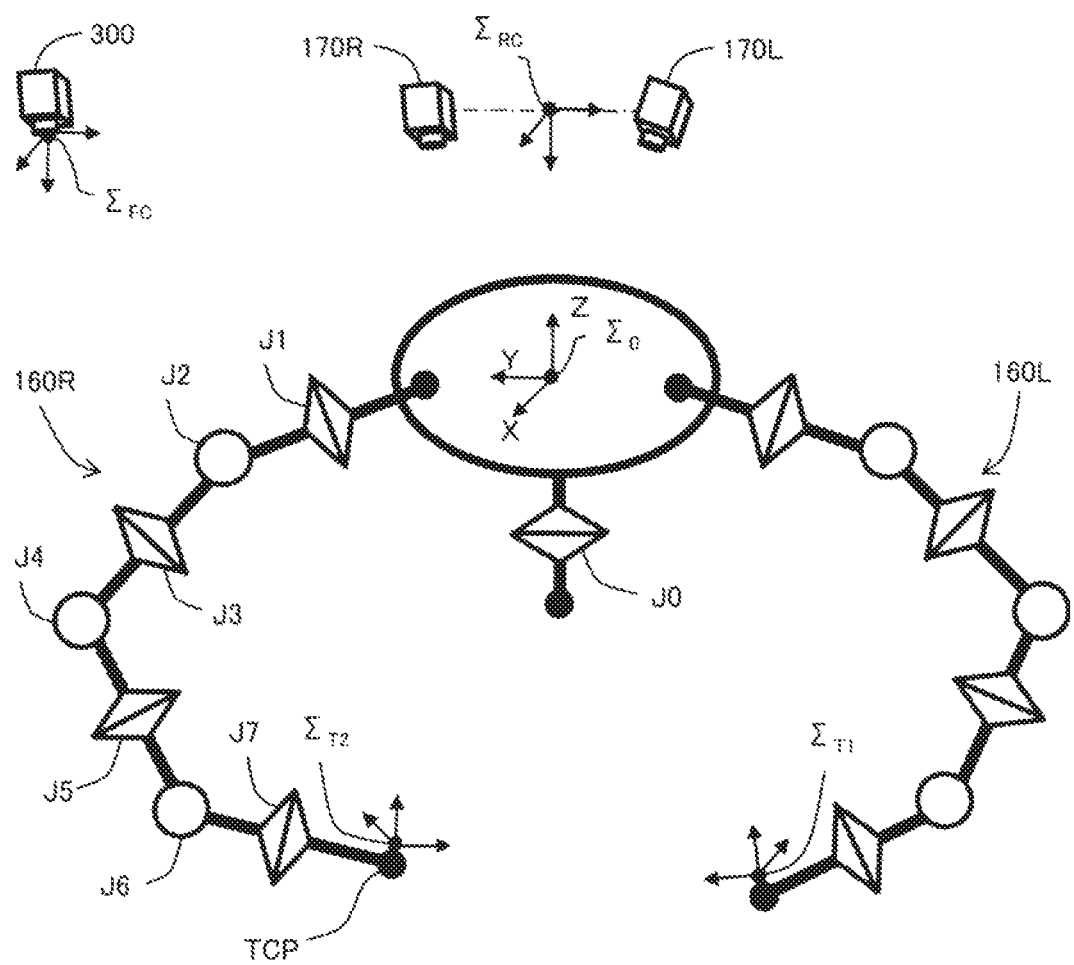
FIG. 5 is an explanatory view illustrating a coordinate system of a robot according to the first embodiment.

FIG. 5 is an explanatory view illustrating a configuration of the robot arm 160 of the robot 100 and various coordinate systems. In each of two arms 160L and 160R, seven joints J1 to J7 are provided. Joints J1, J3, J5, and J7 are torsional joints and joints J2, J4, and J6 are bending joints. A joint J0 is a torsional joint provided between the body portion 120 and the shoulder portion 130 in FIG. 1. This joint J0 corresponds to a torsional joint capable of pivoting the robot camera 170 with respect to the base 110 of the robot 100. An actuator (motor 162 in FIG. 4) for operating the joint and a position detector for measuring a rotation angle is provided in each joint.

A tool center point (TCP) is set on the hand-end of the arm 160. The tool center point TCP can be set to any position according to work contents. Normal control of the robot 100 is executed to control the position and orientation of the tool center point TCP. The position and orientation means a state defined by three coordinate values in a three-dimensional coordinate system and rotation around each coordinate axis.

In FIG. 5, the following coordinate systems are drawn as a coordinate system relating to the robot system.

(1) Robot coordinate system $\Sigma_0$: Coordinate system that uses reference point of robot 100 as coordinate origin (2) Hand-end coordinate systems $\Sigma_{T1}$ and $\Sigma_{T2}$: Coordinate system that uses TCP of arms 160L and 160R as coordinate origin (3) Robot camera coordinate system $\Sigma_{RC}$: Coordinate system that uses predetermined position of robot camera 170 as coordinate origin (4) External camera coordinate system $\Sigma_{FC}$: Image coordinate system of two-dimensional image of external camera 300

In the first embodiment, it is assumed that coordinate systems other than the external camera coordinate system $\Sigma_{FC}$ have already been calibrated in advance and coordinate transformation matrices between the coordinate systems are known. Also, it is assumed that the relationship between the external camera coordinate system $\Sigma_{FC}$ and other coordinate systems is unknown. In FIG. 5, for convenience of illustration, the origin of each coordinate system is drawn at a position shifted from an actual position thereof.

Figure 6:
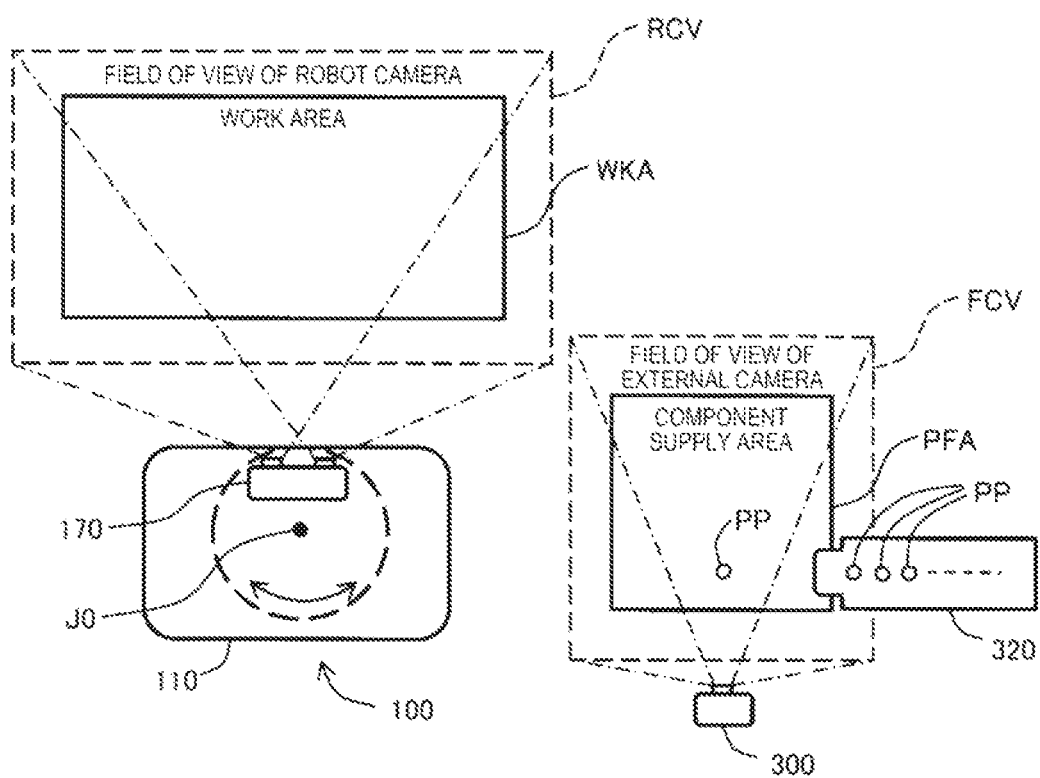
FIG. 6 is an explanatory diagram illustrating a state in which a robot performs work in a work area.

FIG. 6 is an explanatory view illustrating plane arrangement of a state in which the robot 100 performs work in a work area. Here, illustration of the robot arm is omitted, and only the base 110 and the robot camera 170 are drawn as a structure of the robot 100. The trajectory along which the robot camera 170 moves in response to pivoting of the joint J0 is drawn by a broken line.

A field of view RCV of the robot camera 170 is an area including a work area WKA. The robot 100 performs specific work using the two robot arms 160L and 160R in the work area WKA. Specific work is, for example, assembly of components.

On the right side of the robot 100, a component supply area PFA is set. This component supply area PFA is an area different from the work area WKA. The component supply area PFA may partially overlap the work area WKA, but in the example of FIG. 6, the component supply area PFA is set so that the component supply area PFA and the work area WKA do not overlap at all. At a position adjacent to the component supply area PFA, a parts feeder 320 for supplying the component PP to the component supply area PFA is installed. The robot 100 can pick up the component PP supplied into the component supply area PFA by using the right arm 160R. The field of view FCV of the external camera 300 is set in the area including the component supply area PFA. It is preferable that the position and orientation of the external camera 300 are fixed in advance so that the same field of view FCV can always be imaged.

In a state in which the robot 100 is performing work in the work area WKA, the robot camera 170 cannot image the component supply area PFA, but the external camera 300 can image the component supply area PFA. When a new component PP is required in a state in which the robot 100 is performing specific work using the two arms 160L and 160R in the work area WKA, it is possible to pick up the component PP from the component supply area PFA using only one arm 160R and bring the new component to the work area WKA without moving the joint J0. In this case, since the component supply area PFA is imaged by the external camera 300, it is not necessary to image the component PP with the robot camera 170, and it is possible to pick up a new component PP correctly with the arm 160R.

Figure 7:
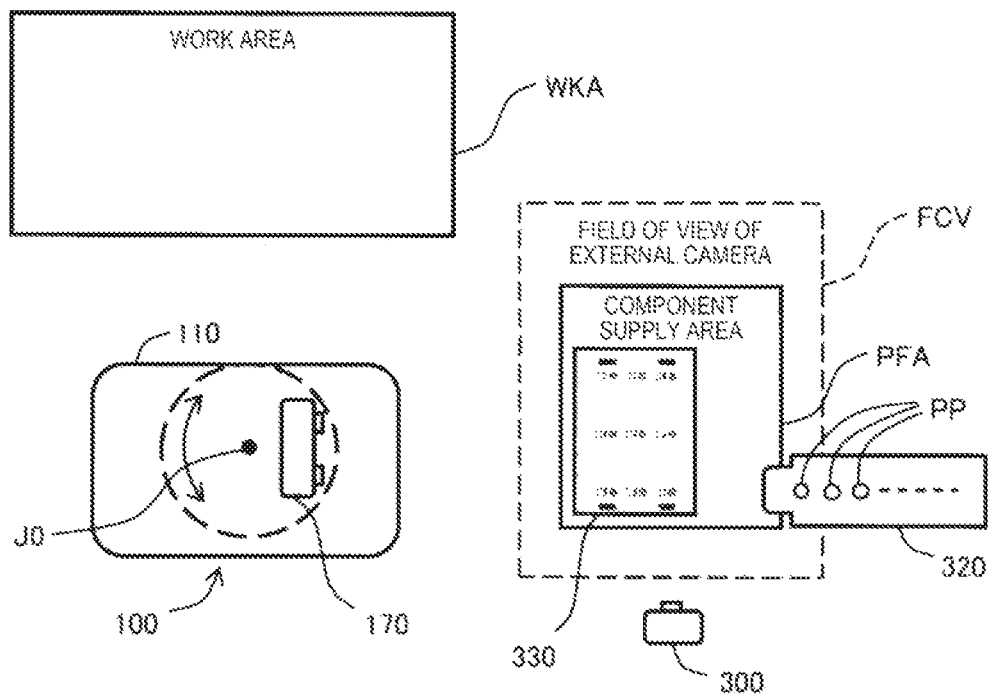
FIG. 7 is an explanatory view illustrating a state where calibration of a second camera is performed.

FIG. 7 is an explanatory diagram illustrating a state where calibration of the external camera 300 is performed. This state is a state in which a field of view (not illustrated) of the robot camera 170 and a field of view FCV of the external camera 300 overlap each other by rotating the joint J0 from the work state illustrated in FIG. 6. At a position where the fields of view of the two cameras 170 and 300 overlap each other, a calibration pattern 330 used for calibration of the external camera 300 is installed. An example of the calibration pattern 330 will be described later. The position where the calibration pattern 330 is installed is referred to as a "calibration position". In the first embodiment, the calibration position at which the calibration pattern 330 is installed is a position outside a range of the field of view of the robot camera 170 in a state where the robot 100 performs work in the work area WKA, and a position that can be taken with the external camera 300.

Figure 8:
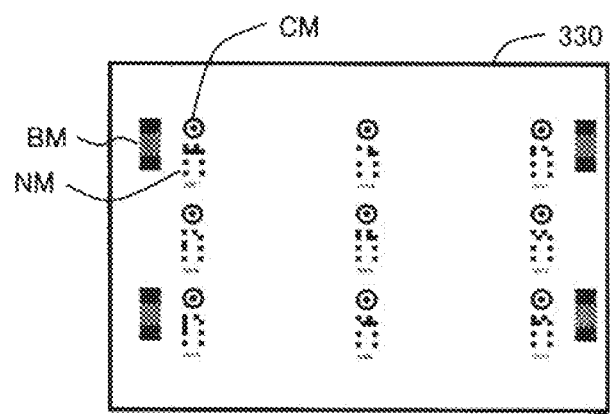
FIG. 8 is a diagram illustrating an example of a calibration pattern.

FIG. 8 is a diagram illustrating an example of the calibration pattern 330. The calibration pattern 330 includes a plurality of calibration markers CM used for camera calibration. In the example of FIG. 8, nine calibration markers CM are drawn on a flat plate-shaped calibration board. In addition, in this example, each calibration marker CM is composed of multiple circles of black and white, and the center point thereof is recognized as the position of the calibration marker CM. However, as the shape of the calibration marker CM, various shapes such as a simple circular shape and a square shape can be used. In the example of FIG. 8, in addition to the calibration markers CM, marks NM each of which represents a number for identifying each calibration marker CM and four marks BM for indicating the outer circumferential position of the entire calibration pattern 330 are displayed. However, other marks other than the calibration marker CM can be omitted. Since the calibration pattern 330 includes the plurality of calibration markers CM, there is an advantage that it is not necessary to install the calibration pattern 330 at a plurality of positions for the purpose of calibrating the external camera 300 to perform imaging and calibration can be completed in one imaging.

Figure 9:
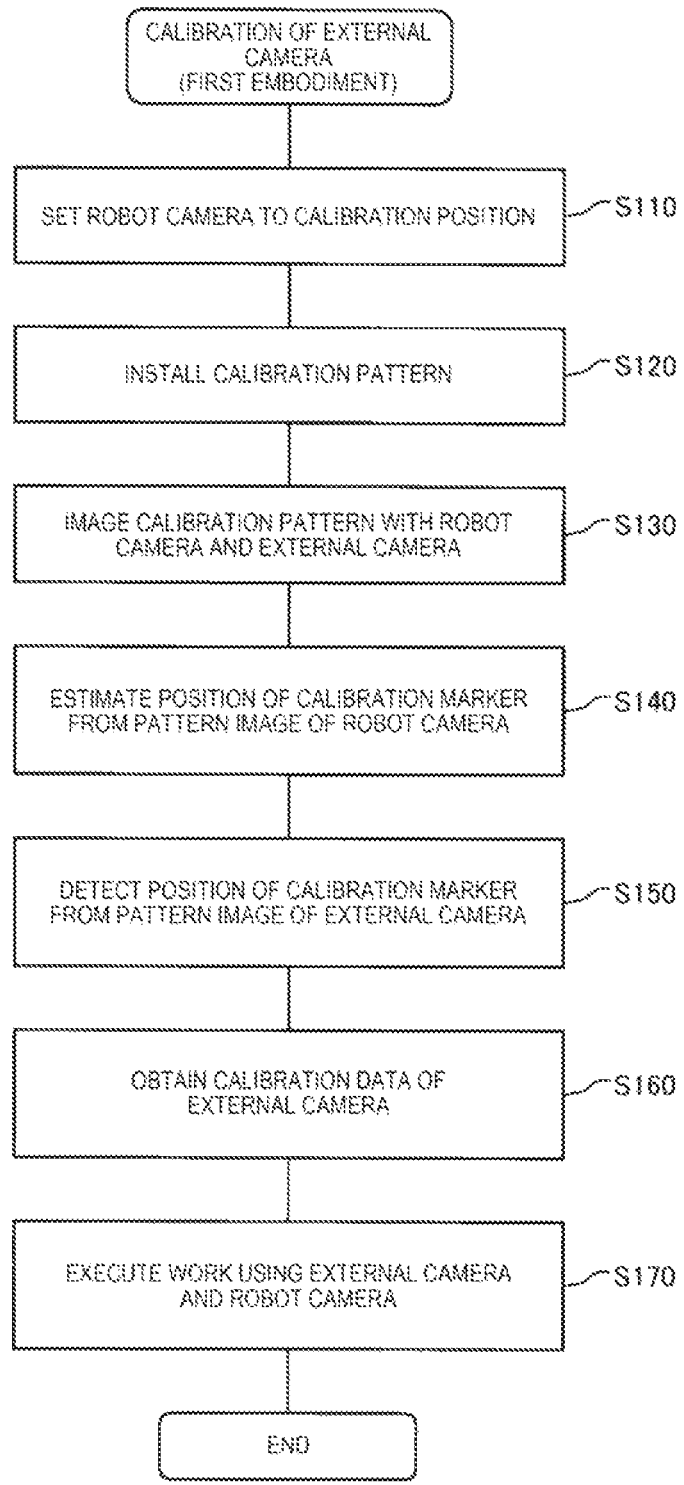
FIG. 9 is a flowchart illustrating a procedure of calibration process in the first embodiment.

FIG. 9 is a flowchart illustrating a procedure of calibration process of the external camera 300 in the first embodiment. This calibration process is performed by the camera calibration execution unit 213 (FIG. 4) before work in the work area WKA is started. In step S110, the state of the robot 100 is set to a state (FIG. 7) where the robot camera 170 can image a calibration position. In step S120, the calibration pattern 330 is installed at the calibration position. The operation of installing the calibration pattern 330 at the calibration position may be performed by an operator or may be performed by the arm 160 of the robot 100. If the calibration pattern 330 is installed using the arm 160, the calibration pattern 330 can be automatically installed only when necessary for the calibration.

In step S130, the robot camera 170 and the external camera 300 image the calibration pattern 330, respectively, and acquire pattern images of the calibration pattern 330, respectively. This pattern image is the image itself of the calibration pattern 330 illustrated in FIG. 8.

In step S140, positions of a plurality of calibration markers CM are estimated from the pattern image captured by the robot camera 170. In the first embodiment, since the robot camera 170 is a 3D camera, a three-dimensional position of the calibration marker CM in the robot camera coordinate system $\Sigma_{RC}$ (FIG. 5) can be estimated from the pattern image captured by the robot camera 170. In addition, the robot camera 170 has already been calibrated, and the robot camera parameter 232 includes a coordinate transformation matrix between the robot camera coordinate system $\Sigma_{RC}$ and the robot coordinate system $\Sigma_0$. Accordingly, in step S140, the three-dimensional position in the robot coordinate system $\Sigma_0$ of the calibration marker CM is calculated using this coordinate transformation matrix.

In step S150, the positions of the plurality of calibration markers CM are respectively detected from the pattern image captured by the external camera 300. In the first embodiment, since the external camera 300 is a 2D camera, a two-dimensional position of the calibration marker CM in the external camera coordinate system $\Sigma_{FC}$ (FIG. 5) is detected from the pattern image captured by the external camera 300.

In step S160, process for obtaining calibration data (external camera parameters 233) of the external camera 300 using the positions of the plurality of calibration patterns CM obtained in steps S140 and S150 and known calibration data (robot camera parameters 232) of the robot camera 170 is executed. In this calibration process, it is necessary to correlate the position of the calibration marker CM obtained in step S140 with the position of the calibration marker CM obtained in step S150. In the example illustrated in FIG. 8, since the mark NM representing the number for identifying each calibration marker CM is included in the calibration pattern 330, it is possible to perform the correlation using this mark NM. Instead of this, an operator may manually perform the correlation. However, if the mark NM representing a number for identifying each calibration marker CM is provided in the calibration pattern 330, it is preferable in that the correlation can be performed automatically.

Process of obtaining calibration data includes processing of estimating a coordinate transformation matrix R in the following equation.

$$\Sigma_0(x,y,z) = R \cdot \Sigma_{FC}(u,v) \quad (1)$$

Here, $\Sigma_0(x,y,z)$ is a three-dimensional coordinate value of the robot coordinate system $\Sigma_0$, and $\Sigma_{FC}(u,v)$ is a two-dimensional coordinate value of the external camera coordinate system $\Sigma_{FC}$.

The coordinate transformation matrix R is a pseudo inverse matrix of a so-called P matrix. The P matrix is a matrix estimated by normal camera calibration and is a matrix for transforming the coordinates in three-dimensional space into two-dimensional image coordinates. When elements of the coordinate transformation matrix R in equation (1) are described, the following equation is obtained.

$$\begin{bmatrix} x \\ y \\ z \\ 1 \end{bmatrix} = \begin{bmatrix} R_{11} & R_{12} & R_{13} \\ R_{21} & R_{22} & R_{23} \\ R_{31} & R_{32} & R_{33} \\ R_{41} & R_{42} & R_{43} \end{bmatrix} \cdot k \begin{bmatrix} u \\ v \\ 1 \end{bmatrix} \quad (2)$$

Here, k is a scale factor (known). The scale factor k may be multiplied by the element $R_{ij}$ of the matrix R so that k=1.

Similar to the ordinary P matrix, the degree of freedom of the coordinate transformation matrix R is 11, and the matrix R can be estimated from six or more sets of measurement results. Accordingly, the calibration pattern 330 preferably includes six or more calibration markers CM. The estimation of such a coordinate transformation matrix R is executed by the transformation matrix estimation unit 214 (FIG. 4). In a case where the external camera 300 is a 3D camera, the coordinate transformation matrix R is a homogeneous transformation matrix of 4 rows and 4 columns.

In a case where the xy plane of the robot coordinate system $\Sigma_0$ and the uv plane of the external camera coordinate system $\Sigma_{FC}$ are parallel, computation of the coordinate transformation matrix R is simpler and computation accuracy is improved and thus, it is preferable that both the xy plane and the uv plane are parallel.

When calibration of the external camera 300 is ended, work is executed using the external camera 300 and the robot camera 170 in step S170. Specifically, when the joint J0 is rotated to change from the state illustrated in FIG. 7 to the state illustrated in FIG. 6, the robot 100 performs specific work using the two arms 160L and 160R in the work area WKA, and a new component PP is needed, the component PP is picked up from the component supply area PFA using only one arm 160R and is brought to the work area WKA, without moving the joint J0. In this case, since the component supply area PFA is imaged by the external camera 300, the new component PP can be picked up correctly by the arm 160R.

As described above, in the first embodiment, before starting work in the work area WKA, it is possible to easily calibrate the external camera 300 by imaging the calibration pattern 330 with both the robot camera 170 and the external camera 300 at a position outside the work area WKA. Further, when work is performed while imaging the work area WKA with the robot camera 170 after calibration process of the external camera 300, in a case where the robot 100 performs an operation different from work in the work area WKA while performing imaging using the external camera 300 in the field of view of the external camera 300, it is possible to accurately image the operation using the calibrated external camera 300.

Figure 10:
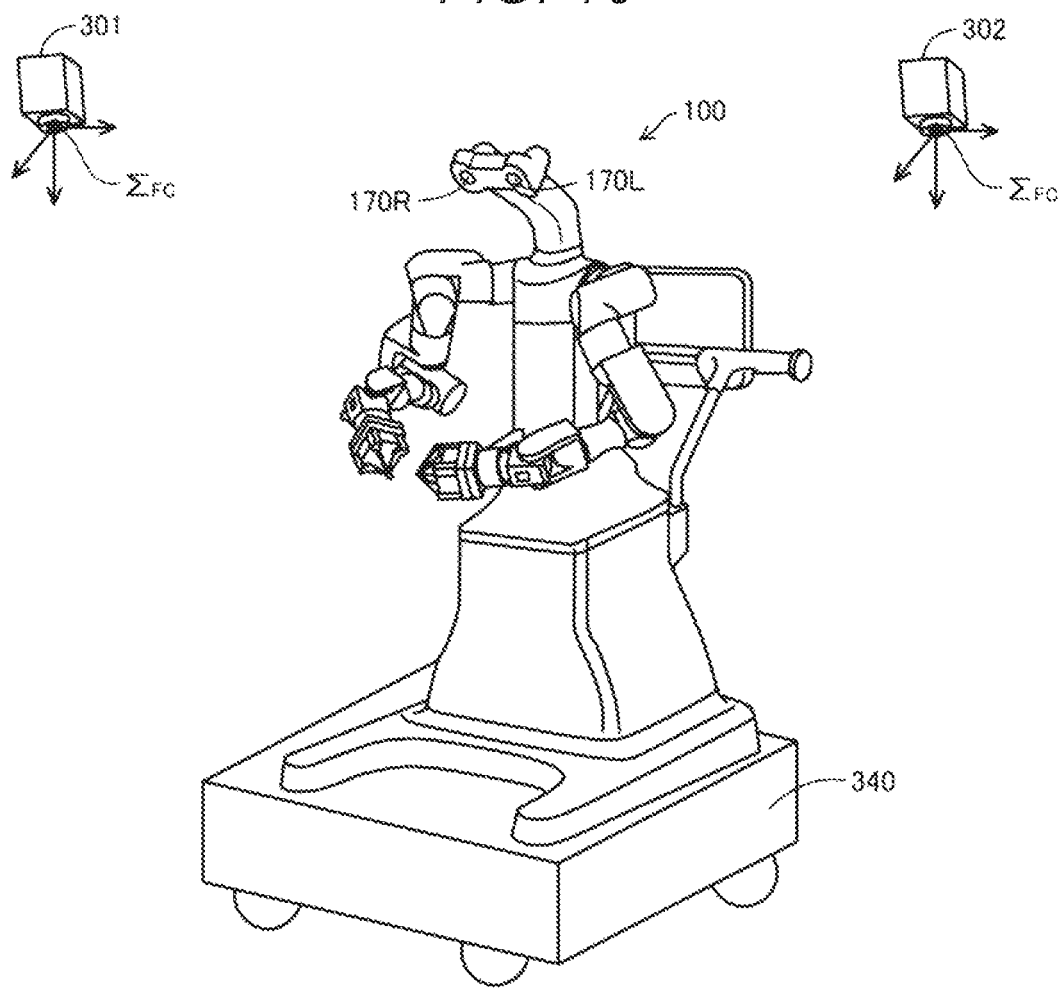
FIG. 10 is a conceptual diagram of a robot system according to a second embodiment.

In the first embodiment, the state (FIG. 6) in which work in the work area WKA is imaged by the robot camera 170 and the state (FIG. 7) in which the calibration pattern 330 is imaged by the robot camera 170 for the calibration of the external camera 300 can be switched only by the operation of the torsional joint J0. Accordingly, it is possible to easily execute calibration of the external camera 300 before starting work in the work area WKA B. Second Embodiment FIG. 10 is a conceptual diagram of a robot system of a second embodiment. The differences from the first embodiment illustrated in FIG. 1 are two points in that the robot 100 is placed on an unmanned transport vehicle 340 to allow free running and two external cameras 301 and 302 are installed. The configuration of the robot 100 itself is the same as that of the first embodiment. The unmanned transport vehicle 340 and the external cameras 301 and 302 are connected to the control device 200 (FIG. 1), and are controlled by the control device 200.

Figure 11:
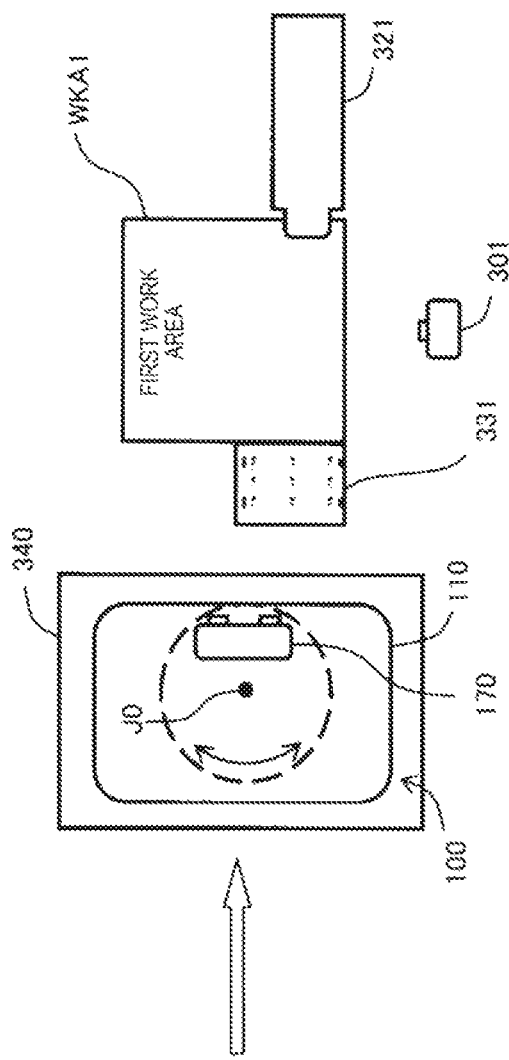
FIG. 11 is an explanatory view illustrating a state where calibration of the second camera is performed in a first work area.

FIG. 11 and FIG. 12 are explanatory diagrams illustrating a relationship between the robot 100 and a work area in the second embodiment. Here, two work areas of a first work area WKA1 and a second work area WKA2 are set. The first external camera 301 has a field of view including the first work area WKA1 and images the first work area WKA1. The second external camera 302 has a field of view including the second work area WKA2 and images the second work area WKA2. When the robot 100 performs work in the individual work areas WKA1 and WKA2, the robot 100 is moved to the front side of the work area by the unmanned transport vehicle 340. Two work areas WKA1 and WKA2 are separated to such an extent that it is impossible to simultaneously image both work areas WKA1 and WKA2 in one external camera 301 (or 302) and one set of robot camera 170. The number of work areas where the robot 100 is to perform work is not limited to two but may be set to three or more.

Calibration patterns 331 and 332 are respectively installed in the vicinity of the individual work areas WKA1 and WKA2. The first calibration pattern 331 is used for calibrating the first external camera 301. The second calibration pattern 332 is used for calibrating the second external camera 302. These calibration patterns 331 and 332 are the same as the calibration pattern 330 illustrated in FIG. 8. Instead of using the two calibration patterns 331 and 332, calibration of the two external cameras 301 and 302 may be performed using one calibration pattern 330. In this case, when calibration of one external camera 301 or 302 is to be performed, the calibration pattern 330 is disposed in the vicinity thereof.

Part feeders 321 and 322 are further installed at positions adjacent to the individual work areas WKA1 and WKA2. However, the parts feeders 321 and 322 can be omitted.

The state illustrated in FIG. 11 is a state in which calibration of the first external camera 301 is performed in the first work area. FIG. 12 illustrates a state in which calibration of the second external camera 302 is performed in the second work area. The control device 200 executes calibration process of the external camera 301 or 302 described below each time the robot 100 moves and reaches one work area of the plurality of work areas WKA1 and WKA2.

FIG. 13 is a flowchart illustrating a procedure of calibration process of the external cameras 301 and 302 in the second embodiment. The difference from the processing procedure of the first embodiment illustrated in FIG. 9 is only step S210, and the other steps are substantially the same as those in FIG. 9.

In step S210, the robot 100 moves to a work position in front of one work area WKA1 or WKA2. In step S120, the calibration pattern 331 or 332 is installed at the calibration position. As illustrated in FIGS. 11 and 12, in a case where the calibration patterns 331 and 332 are previously installed in the vicinity of the two work areas WKA1 and WKA2, the step S120 can be omitted. Instead, the operator may perform an operation of installing the calibration pattern 331 or 332 at the calibration position, or the arm 160 of the robot 100 may perform the operation. If the calibration pattern 331 or 332 is installed using the arm 160, the calibration pattern can be automatically installed only when necessary for the calibration.

Processing in steps S130 to S170 is the same as the processing described with reference to FIG. 9. However, in step S170, work is executed using the calibrated external camera 301 or 302 and the robot camera 170 in the same state as the state in which calibration of the external camera 301 or 302 is performed without rotating the joint J0. That is, each time the robot 100 moves and reaches one work area out of the plurality of work areas WKA1 and WKA2, calibration process of the external camera 301 or 302 that images the work area is executed, and the work is started when the calibration process is completed.

As described above, in the second embodiment, it is possible to easily execute calibration of the external camera 301 (or 302) by imaging the calibration pattern 331 (or 332) with both the robot camera 170 and the external camera 301 (or 302) before starting work in the individual work areas of the plurality of work areas WKA1 and WKA2. Further, since the work area of the external camera 301 (or 302) can be imaged using both the robot camera 170 and the external camera 301 (or 302) after calibrating the external camera 301 (or 302), it is possible to accurately image work in the work area. For example, during work of the robot 100, there is a possibility that a portion of the field of view of the robot camera 170 may be shielded by the robot arm 160 and the robot camera 170 cannot image components or workpieces. Even in such a case, since the work area is imaged using the external camera 301 (or 302), it is possible to more reliably image components and workpieces.

In the second embodiment, the unmanned transport vehicle 340 is used as moving means of the robot 100, but the robot 100 may be moved by moving means other than the unmanned transport vehicle 340. For example, moving means may be provided on the base 110 of the robot 100. Also, in these cases, it is preferable that moving means is configured so that the robot 100 moves to a position other than the work positions in front of the plurality of work areas. Also, in this case, it is possible to easily execute calibration of the external camera by using the robot 100 having a high degree of freedom of movement.

C. Other Embodiment

In the embodiment described above, the camera 170 provided in the head portion 150 of the robot 100 is used as a robot camera, but the robot camera may be provided in other portions. For example, a camera installed at a location that is not the robot arm 160 may be used as the robot camera to calibrate the external camera. In this way, it is possible to easily perform calibration of the external camera by using a camera installed in a portion that is not the robot arm 160, such as the base 110 of the robot 100 or the casing. Alternatively, calibration of the external camera may be performed by using a camera (hand eye 175) installed on the robot arm 160 as the robot camera. In any of these cases, it is easier to calibrate the external camera by using what can be configured as a 3D camera as the robot camera.

In the embodiments described above, a dual arm robot having two arms 160R and 160L is used, but a robot having one arm can also be used. Also, the number and type of joints of the robot can be changed in a predetermined manner.

Furthermore, in the embodiments described above, a single calibration pattern includes all of a plurality of calibration markers CM required to calibrate the external camera, but the plurality of calibration markers CM may be divided into and arranged in a plurality of calibration patterns. In this case, the plurality of calibration patterns are imaged by both the robot camera and the external camera.

The matters disclosed in the present specification are not limited to the embodiments, examples, or modification examples described above and can be embodied in various configurations in a range without departing from the gist thereof. For example, technical features of the embodiments, the examples, and the modification examples corresponding to technical features of respective aspects described in Summary section can be appropriately replaced or combined in order to solve some or all of the problems described above or achieve some or all of effects described above. When the technical features are not explained as essential ones, the technical features can be deleted.

The entire disclosure of Japanese Patent Application No. 2017-197296, filed Oct. 11, 2017 is expressly incorporated by reference herein.

What is claimed is:

1. A robot system comprising:

a robot having a robot arm and a first camera, the first camera being attached on the robot, the first camera having a first field of view in a first mode and a second field of view in a second mode, the first field of view being different from the second field of view, wherein, when the robot performs a work by moving the robot arm with respect to a component in a work area, the first camera captures an image of only the work area by using the first field of view in the first mode, and when the robot system performs a calibration process, the first camera captures an image of only a calibration area in which a calibration pattern is located by using the second field of view in the second mode;

a second camera that is installed separately from the robot, the second camera having a third field of view in the first and second modes, the third field of view being overlapped with the second field of view of the first camera and different from the first field of view of the first camera; and a control device that controls the robot and the second camera, wherein the control device includes a processor, the processor being configured to execute a program stored in a memory so as to:

drive a joint of the robot to make the first camera in the second mode and cause the first camera having the second field of view to image the calibration area before the work is executed in the work area;

make the first and second cameras in the second mode, cause the first camera to image the calibration pattern located at the calibration area to acquire a first pattern image, and cause the second camera to image the calibration pattern located at the calibration area to acquire a second pattern image;

execute the calibration process for obtaining calibration data of the second camera using the first pattern image, the second pattern image, and calibration data of the first camera stored in the memory; and execute the work in the work area while the first camera images the work area with the first field of view after executing the calibration process and execute an operation in the calibration area using the robot arm while the second camera images the calibration area with the third field of view, wherein, when the component is supplied to the calibration area, the processor is configured to cause the arm to pick up the component in the calibration area and move the picked up component from the calibration area to the work area during the executed work and the executed operation while the first camera images only the work area with the first field of view and the second camera images the calibration area with the third field of view.

2. The robot system according to claim 1,
wherein the joint of the robot is a torsion joint that rotates a position of the first camera with respect to a base of the robot.

3. The robot system according to claim 1, wherein the first camera is a 3D camera, and
the second camera is a 2D camera.

4. The robot system according to claim 1, wherein the first camera is not attached on the robot arm.

5. The robot system according to claim 1, wherein the first camera is attached on the robot arm.

6. The robot system according to claim 1,
wherein the processor is configured to control the robot arm to place the calibration pattern in the calibration area before the processor makes the first and second cameras in the second mode to image the calibration pattern to acquire the first and second pattern images, respectively.

* * * * *